United States Patent

Kelley et al.

[11] Patent Number: 5,768,001
[45] Date of Patent: Jun. 16, 1998

[54] ROTATING BEAM DEFLECTOR HAVING AN INTEGRAL WAVE FRONT CORRECTION ELEMENT

[75] Inventors: Henry A. Kelley, Woburn, Mass.; Michael C. Tempest, Poole, United Kingdom

[73] Assignees: Agfa Division, Bayer Corp., Wilmington, Mass.; Westwind Air Bearings, Ltd., Dorset, England

[21] Appl. No.: 662,562

[22] Filed: Jun. 10, 1996

[51] Int. Cl.$^6$ ............................................. G02B 26/08
[52] U.S. Cl. ...................... 359/196; 359/197; 359/209; 359/211; 359/212; 359/226; 359/17
[58] Field of Search ....................... 359/196–215, 359/220–226, 17, 18, 558, 900

[56] References Cited

U.S. PATENT DOCUMENTS

| | | | |
|---|---|---|---|
| 5,323,259 | 6/1994 | Gibbs | 359/209 |
| 5,367,399 | 11/1994 | Kramer | 359/206 |
| 5,610,751 | 3/1997 | Sweeney et al. | 359/226 |

FOREIGN PATENT DOCUMENTS 0 450 901 A3  4/1991  European Pat. Off. ........ G02B 26/10

WO 96/35211  11/1996  WIPO ........................ G11B 7/00

*Primary Examiner*—James Phan
*Attorney, Agent, or Firm*—Julie A. Krolikowski; Edward L. Kelley

[57] ABSTRACT

An inclined mirror is provided in a cylindrical housing which has an open end and a closed end. An optical planar glass plate or window is mounted at the open end of the cylindrical housing. A laser beam enters the housing through the window and is reflected off the inclined mirror. The reflected beam leaves the housing through a side aperture in the housing. The cylindrical housing is rotated to scan the beam through a range of angles. Rotation of this optical system induces astigmatism in the beam due to the deformation of the inclined mirror at high rotational speed. If the window is tilted so that the entering laser beam is no longer normal to the window surface, then the window will induce a degree of astigmatism in the laser beam. The angular position of the window can be adjusted relative to the inclined mirror, thus compensating for the dynamic astigmatism due to rotation. A wedge is added to the planar surface of the tilted window to compensate for the coma induced in the beam by the tilt of the planar window.

15 Claims, 6 Drawing Sheets

ROTATING BEAM DEFLECTOR HAVING AN INTEGRAL WAVE FRONT CORRECTION ELEMENT

BACKGROUND OF THE INVENTION

The invention is related to beam deflectors of scanners used in imaging systems and the like, and more specifically to compensating for aberrations of the beam induced by a beam deflecting apparatus used in such systems.

Typically beam deflectors of the single facet type operate at very high rotational speeds compared to multifaceted deflector. This is because single facet deflectors, such as inclined reflective surfaces and prisms, scan only one line per full rotation, whereas a multifaceted deflector scans multiple lines per rotation. The single facet deflector operates at a higher rotational speed to scan the same number of lines that a multifaceted deflector scans in the same amount of time. It is this high rotational speed that causes deflector deformation which produce beam aberrations, and therefore the problem is more common in single facet systems.

When a beam deflector is rotated about a spin axis at a high rotational velocity, as high as 20,000 rpm's, the deflector deforms due to the centrifugal force created by the high rotational velocity, and returns to its original shape when it is not subjected to the centrifugal forces. The deformation of the deflector is proportional to the square of the rotational velocity of the deflector and inversely proportional to the specific stiffness of the deflector material. Therefore as the rotational velocity of the deflector increases, the deformation also increases.

Deflector deformation consequently affects the image quality of a scanner system. A beam deflected by a deformed deflector has aberrations or wavefront errors that cause the rays of the beam to no longer converge at a single point. The wavefront aberration is defined as the path-length difference of light between the wavefront reflected by the deformed mirror and the wavefront reflected by a perfectly plane mirror. If not corrected, the wavefront errors increase beam spot size at the focal plane of the imaging system, and degradation of image quality results.

Attempts have been made to prevent the occurrence of wavefront errors in beams deflected by rotating deflectors by developing a non-deformable deflector. High stiffness deflectors can be constructed from various high strength materials, such as tungsten and beryllium, however the high cost of these materials in addition to the expensive machining and special handling of these materials is undesirable.

An alternative method of shaping the deflector uses finite element analysis to design a deflector that deforms in a controlled manner. The deflector may be shaped in a predetermined configuration according to the operating rotational velocity, to anticipate and compensate for undesirable deformations and therefore reduce aberrations. However, this method adds mass to the deflector, and the resulting deflector shape can cause turbulence as well as be difficult to balance. These secondary problem also contribute to reduced image quality.

The beam deflector apparatus disclosed herein has means for optically compensating for wavefront errors in the beam and is both simple and inexpensive.

Accordingly, it is an object of the present invention to eliminate beam wavefront errors in a beam deflector apparatus while using an inexpensive deflector.

It is another object of the present invention to provide a means for compensating for astigmatism in a deflected beam of a rotating beam deflecting apparatus.

It is yet another object of the present invention to provide a means to compensate for astigmatism and coma in a beam wavefront induced in a beam deflecting apparatus. The compensating means can also provide secondary benefits by sealing the apparatus, thereby reducing air turbulence, acoustic noise, and deflector contamination.

SUMMARY OF THE INVENTION

The invention is a beam deflecting apparatus having an axis of rotation and a mounting member rotatable about the axis of rotation. The beam deflecting apparatus comprises a deflector for deflecting a beam and for causing a particular wavefront error in the beam during rotation of the deflector at a particular angular velocity about the axis of rotation; a wavefront modifier for modifying the particular wavefront error in the beam, the wavefront modifier and the deflector being mounted on the mounting member in a fixed orientation relative to one another and to the mounting member. The wavefront modifier and the deflector are rotated with the mounting member at the particular angular velocity.

A method is provided for modifying wavefront errors in a beam caused by at least one optical element in a beam scanning apparatus. The apparatus includes a deflector and a wavefront modifier, and the method comprises the steps of first rotating the wavefront modifier and the deflector in unison about an axis of rotation. Next, the beam is directed onto the deflector thereby deflecting the beam and causing a wavefront error in the beam. Lastly, the wavefront error is modified in the beam by passing the beam through the wavefront modifier.

BRIEF DESCRIPTION OF THE DRAWINGS

The features and objects of the invention will become apparent in the following description taken with the accompanying drawings, in which.

DETAILED DESCRIPTION OF THE INVENTION

Figure 1:
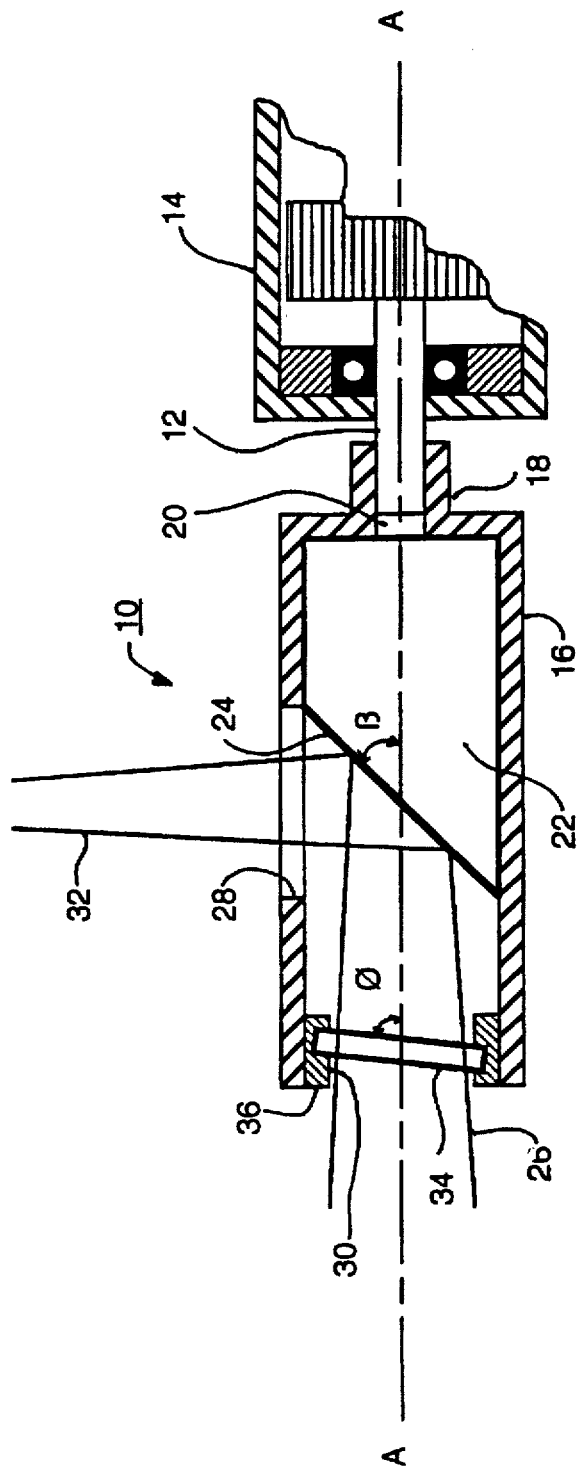
FIG. 1 is a side sectional view of a spin mirror module with wavefront error correction means according to the present invention, depicted in a non-rotational state.

A spin mirror module, generally referred to by reference numeral 10, is shown in FIG. 1 attached to the shaft 12 of a spin motor 14 so as to be rotated by the spin motor 14. A cylindrical housing 16 has a hub portion 18 at its first end where the spin mirror module 10 can be mounted onto the spin motor shaft 12. A bore 20 is provided in the hub portion 18 to receive the spin motor shaft 12. The spin mirror module 10 is secured to the spin motor shaft 12 at the hub portion 18 by conventional means such as set screws or a keyed shaft (not shown). A spin axis of the spin mirror module 10 is indicated by line A—A, which coincides with the center of mass of the cylindrical housing 16 to provide balanced rotation.

A mirror 22 is mounted and secured to the inside of the housing 16. The mirror 22 is formed of a solid metal cylinder such as aluminum, cut at a 45° angle with a reflective coating for the mirror surface 24. The mirror surface 24 is elliptical in shape due to the incline $\beta$ with respect to the spin axis A—A. An input beam 26 directed parallel to the spin axis A—A and onto the mirror surface 24, will be reflected by the mirror 22 to a side of the housing 16 where an exit aperture 28 is provided. In the preferred embodiment shown in FIG. 1, the mirror 22 has a flat surface 24 that is inclined at an angle $\beta$ approximately 45° to the spin axis A—A so that the beam 26 is reflected approximately 90°, however it will be appreciated that other incline angles may be used.

The housing 16 has an entrance aperture 30 at its second end to allow the input beam 26 to enter the housing 16. The exit aperture 28 is provided in the side of the housing 16 to allow the reflected output beam 32 to exit the housing 16. It will be understood that a laser beam 26 entering the module 10 through the entrance aperture 30 will be deflected through the exit aperture 28 so that when the module 10 is rotated about the spin axis A—A, the output beam 32 can be scanned through 360°.

Near the entrance aperture 30, an optical plane parallel glass plate 34 is held in place by a mounting member 36. The plane parallel plate 34 is used to induce astigmatism in a converging input beam 26 when it passes through the plate 34 at an angle $\emptyset$ which is not perpendicular to the plate 34. It is well known in the art to insert a plane parallel plate in a convergent or divergent beam to introduce aberrations. However, the aberrations of a rotating element cannot be corrected by a stationary tilted plate within the beam space, because the astigmatism in the beam rotates with the element. The mirror 22 and the plane parallel plate 34 are mounted within the cylindrical housing 16 in a predetermined fixed relationship relative to one another and to the housing 16. These elements of the spin mirror module 10 rotate together about the spin axis A—A when the module 10 is rotated by the spin motor shaft 12.

A particular fixed orientation of the plane parallel plate 34 in combination with a particular thickness is required in order to obtain the optimal results in compensating for aberrations in the scanning system. The plate may be tilted either toward or away from the mirror angle of incline $\beta$, at corresponding angles of $\emptyset$ (shown in FIG. 1) or 180°-$\emptyset$ respectively, and will have the same affect on the amount of aberrations introduced in the beam. Changes in the value of $\emptyset$ increase or decrease the amount of aberrations. The operation of the spin mirror module 10 and its benefits will be described hereinafter.

The spin mirror module 10 is mounted to the spin motor shaft 12 and secured thereto. The module 10 is rotated at very high speed by the spin motor 14, subjecting the spin mirror module 10 to large centrifugal forces. Stress is produced in the mirror 22 by the centrifugal forces causing the mirror 22 to deform (FIG. 2) while rotating at high speed. The stress increases in the mirror 22 with increasing radial distance from the spin axis A—A and with increasing angular velocity of the spin mirror module 10 about the spin axis A—A. As the amount of deformation is proportional to the amount of stress, the deformation also increases with increasing distance from the spin axis A—A and with increasing angular velocity of the spin mirror module 10. The mirror 22 returns to its original shape when the spin mirror module 10 is not rotating. An illustrative example of mirror deformation during high speed rotation is shown in FIG. 2.

Figure 2:
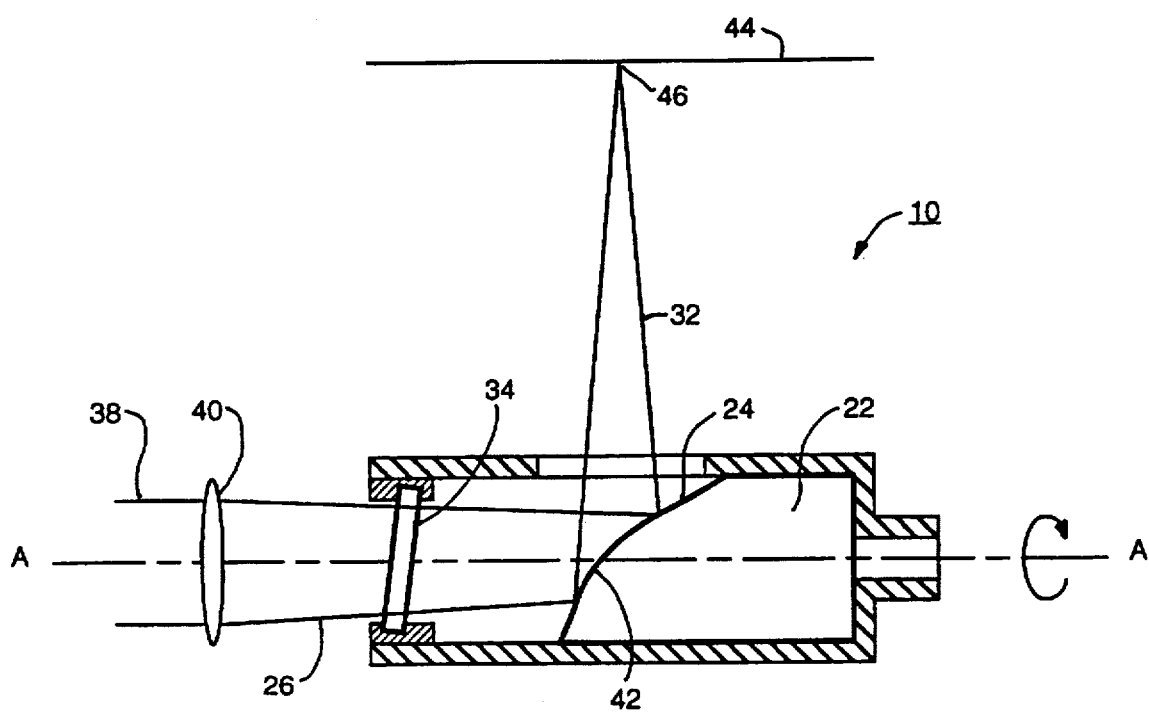
FIG. 2 is a side sectional view of the spin mirror module of FIG. 1 in a rotational state with the mirror shown in a deformed state (exaggerated for illustrative purposes, deformation shown is exemplary)

Referring now to FIG. 2, a collimated beam 38 is shown passing through a beam decollimating focusing lens 40. The converging input beam 26 is directed into the rotating spin mirror module 10 through the tilted plane parallel plate 34, where a first aberration is introduced into the beam's wavefront. Then the beam 26 is reflected by the deformed mirror surface 42 and a second aberration is introduced into the beam's wavefront. The beam 32 is then reflected onto an imaging surface 44 where it appears as an image spot 46. The appearance of the image spot 46 on the imaging surface 44 depends on the resultant wavefront of the reflected beam 32. The resultant wavefront of the beam 32 exiting the spin mirror module 10 is a combination of the first wavefront error caused by the plane parallel plate 34 and the second wavefront error caused by the deformed mirror surface 42.

Figure 3A:
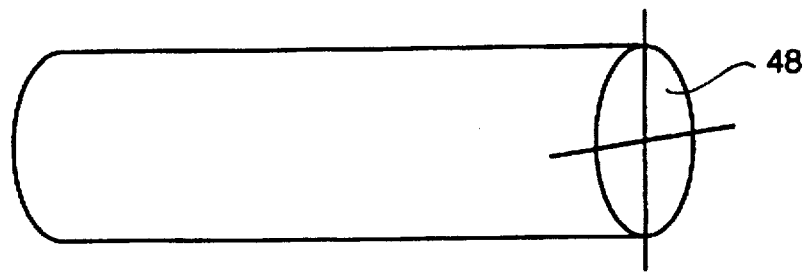
FIG. 3a is an illustration of a beam with no wavefront error.
Figure 3B:
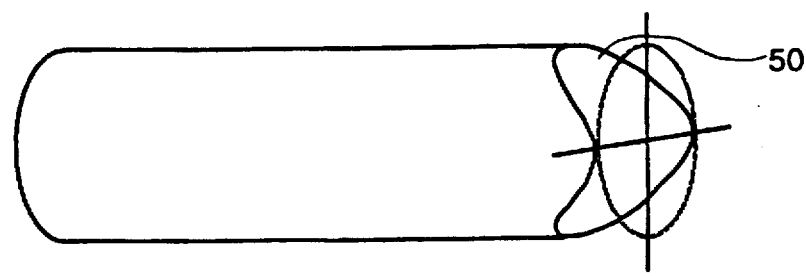
FIG. 3b is an illustration of a beam with a wavefront error known as astigmatism.
Figure 3C:
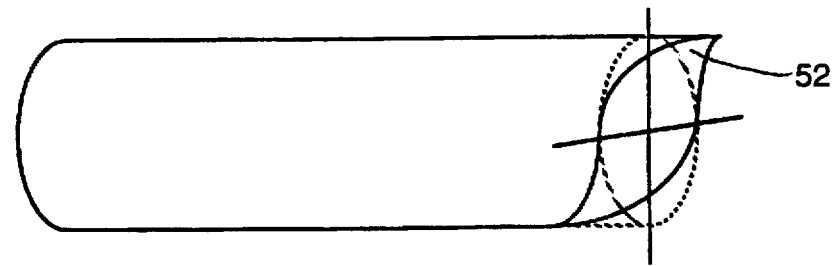
FIG. 3c is an illustration of a beam with a wavefront error known as coma.

Referring to FIGS. 3a–c, the approximate wavefronts 48, 50, 52, of a beam are shown with no error (FIG. 3a), with astigmatism (FIG. 3b) and with coma (FIG. 3c) respectively. These aberrations cause the image spot 46 (FIG. 2) to be distorted at the imaging surface 44. In the preferred embodiment of the spin mirror module 10 shown in FIGS. 1 and 2, the first aberration in the input beam 26 is caused by the tilted plane parallel plate 34 and resembles a combination of astigmatism 50 and coma 52. The second aberration in the output beam 32 is caused by the deformed surface 42 of the mirror 22 and substantially resembles double the actual deformed surface profile 42. For this particular embodiment of a 45° inclined planar mirror surface 24, the aberration resembles astigmatism 50. The optical plane parallel plate 34 (FIGS. 1 and 2) is positioned in the entrance aperture 30 to correct for the astigmatism 50 of the mirror 22. The tilt of the plate 34 with respect to the spin axis A—A introduces a compensating astigmatism (i.e. of reversed sense) in the beam before it is deflected by the deformed mirror 42, so that the astigmatism normally induced by the deformed mirror 24 will add to the compensating astigmatism created by the tilted plane parallel plate 34, resulting in a partially corrected resultant wavefront still having coma 52 when it leaves through the exit aperture 28.

Figure 4:
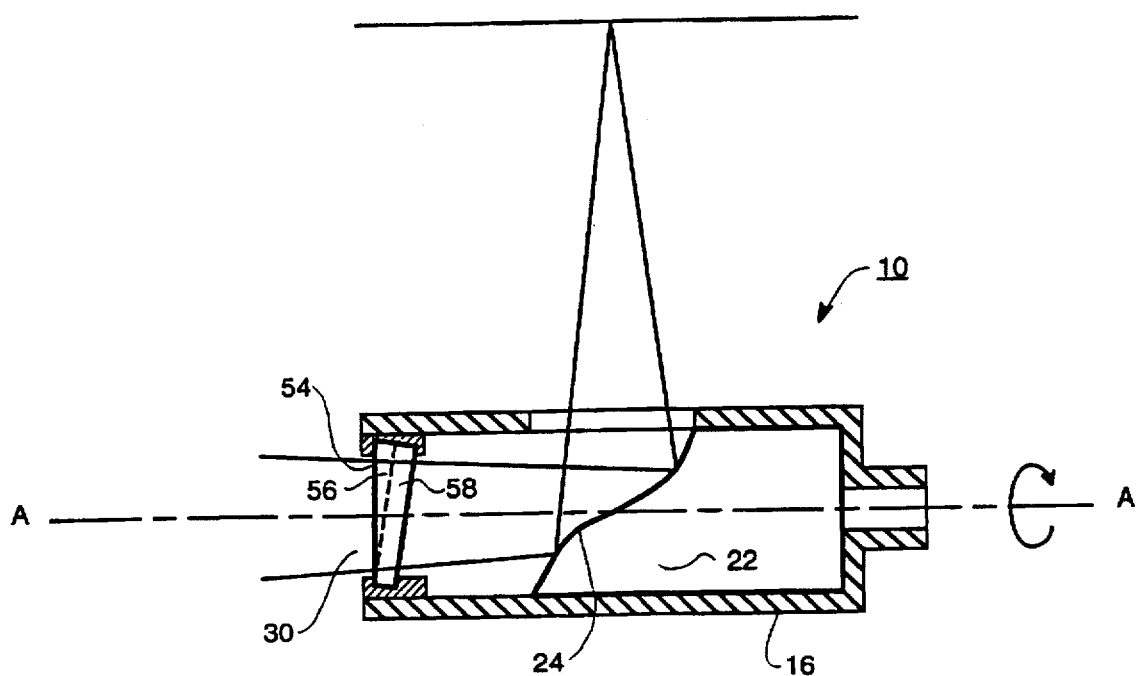
FIG. 4 is a side sectional view of a second embodiment of the spin mirror module with wavefront error correction means according to the invention (exaggerated for illustrative purposes, deformation shown is exemplary)

In the embodiment above, the coma 52 is caused by the tilt of the plane parallel plate 34. Referring now to FIG. 4, the coma 52 can be corrected by using a tilted wedged plate 54 with non-parallel sides in the entrance aperture 30 instead of the plane parallel plate 34. A wedge portion 56 introduces an amount of coma 52 which cancels coma produced by the tilt of a plane parallel plate portion 58, while still leaving a net astigmatism. It will be understood that the plane parallel plate 34 or wedge plate 54 can be angled with respect to the mirror surface 24 (FIG. 1) specifically to correct for the aberrations in the beam that occur at a given angular velocity. Further, the amount of correction of the wavefront error can be controlled. For example, it may be desirable to modify the overall wavefront error to increase astigmatism in the beam rather than correct it. This may be accomplished by positioning the plate in a predetermined orientation with respect to the mirror and the angle of the beam and is useful for compensating for other astigmatic elements of the overall optical system.

The location of the plane parallel plate 34 or wedged plate 54 in the entrance aperture 30 serves to substantially seal the cylindrical housing 16. In the prior art, air is drawn in along the spin axis due to the pumping action of the spinning mirror. The rotating beam deflector shears the air causing acoustical noise. The sealed housing 16 is considerably less noisy due to reduced airflow and turbulence inside the housing, eliminating the need for sound dampening by acoustic damping materials. Further, the mirror 22 is less vulnerable to contamination by dust particles in the air that can cause corrosion and degradation of the mirror surface 24 over time and result in poor image quality. The sealed spin mirror module 10 reduces cost by saving on acoustic damping materials and deflector surface replacements.

Figure 5:
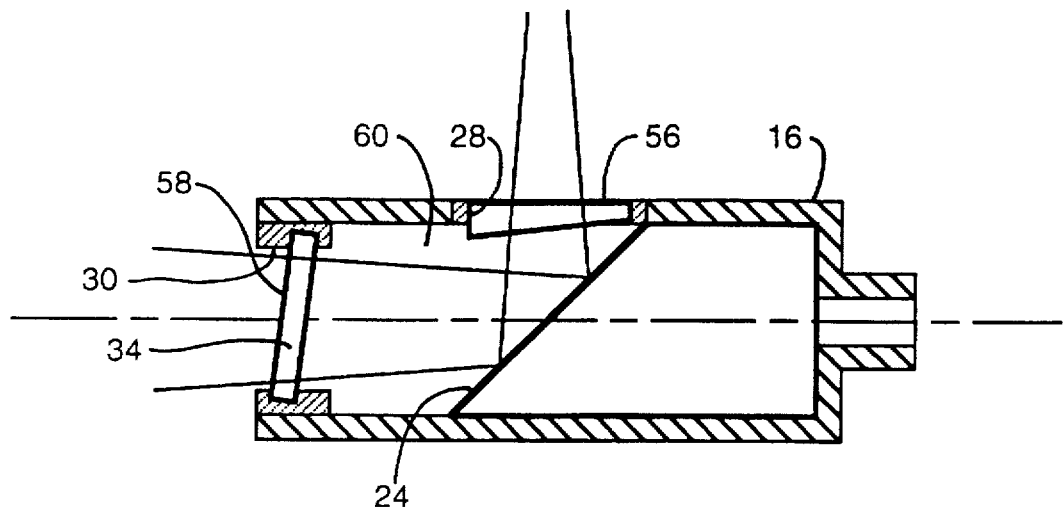
FIG. 5 is a side sectional view of a third embodiment of the spin mirror module with wavefront error correction means according to the invention.

In an alternative embodiment, shown in FIG. 5, the tilted plane parallel plate 34 is located in the entrance aperture 30, and corrects for astigmatism 50 (FIG. 3B) produced in the reflected beam 32 by the deformed mirror 42 (FIG. 4). In the exit aperture 28, a wedge 56 is provided to compensate for the coma 52 (FIG. 3C) produced in the input beam 26 by the tilted plane parallel plate 34. This embodiment seals the housing 16 at both the entrance and exit apertures 30, 28, preventing air flow through the housing cavity 60. Noise of the spin mirror module 10 is reduced and contamination and corrosion of the mirror surface 24 is virtually eliminated. It will be appreciated that the plane parallel plate 34 and the wedge 56 can be interchanged or arranged in other configurations and still perform the wavefront error corrections. The inside of the sealed housing 16 can also be evacuated to create a vacuum or can be filled with a fluid having a refractive index different from air.

Figure 6:
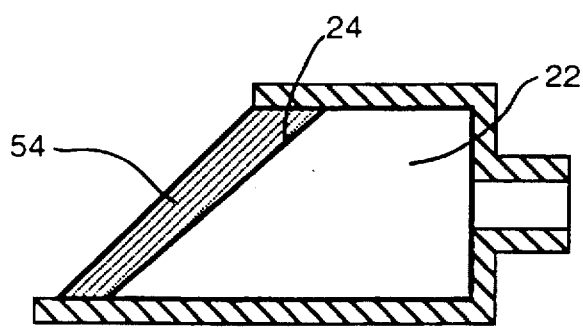
FIG. 6 is a side sectional view of a fourth embodiment of the spin mirror module with wavefront error correction means according to the invention.

In another embodiment, shown in FIG. 6, a wedged glass plate 54 is attached to the surface 24 of the spin mirror 22. The housing is open, and serves as a rotating mount for the mirror and the wedged glass plate. The wedged plate 54 corrects for the wavefront errors in the beam. Specifically, the astigmatism caused by the deformed mirror surface and the coma caused by the tilt of the wedged plate 54 with respect to the input beam are both correct for by the wedged tilted plate. For this embodiment, the enclosed housing as described above (FIG. 5) may be used to reduce acoustic noise in which case the entrance and exit apertures can be sealed by thin transmissive windows to gain the related advantages.

Figure 7:
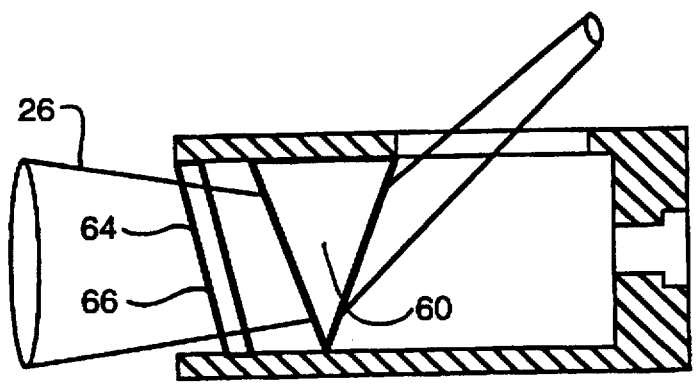
FIG. 7 is a side sectional view of a fifth embodiment of the spin mirror module with wavefront error correction means according to the invention.
Figure 8:
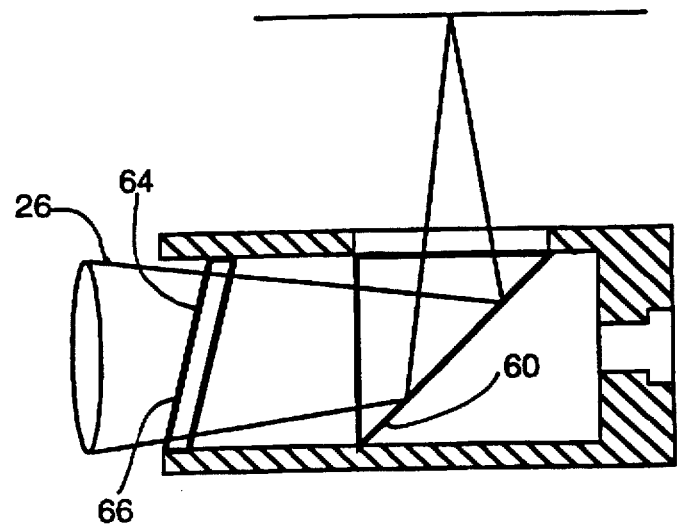
FIG. 8 is a side sectional view of a sixth embodiment of the spin mirror module with wavefront error correction means according to the invention.
Figure 9:
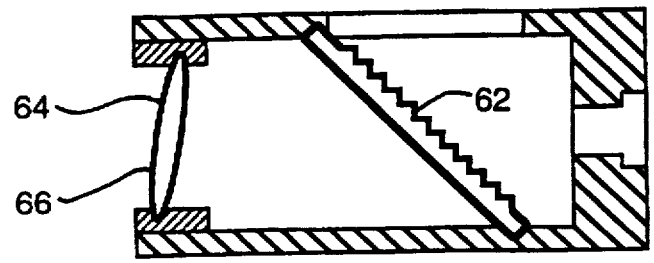
FIG. 9 is a side sectional view of a seventh embodiment of the spin mirror module with wavefront error correction means according to the invention.

In the described preferred embodiment, the spin mirror module uses a reflective element, the mirror, as a beam deflector. A refractive element, namely a plate or two planar surfaces having a refractive medium therebetween, is used as the wavefront modifying means. In alternative embodiments such as those shown in FIGS. 7-9, the beam can be deflected by a refractive element such as a prism 60 (shown in FIGS. 7 and 8), wedge, or lens, or a diffraction element such as a holographic or binary optical element 62 (shown in FIG. 9). In FIG. 8 a prism is shown being used as a reflective element and in FIG. 7 the prism is used as a refractive element. The beam deflector can also be a combination of two or more reflective, refractive and diffraction elements. Similarly, the wavefront modifying means 64 can include a reflective element or a diffraction element singly or in combination with a refractive element 66 (shown in FIGS. 7 and 8) or otherwise to modify the wavefront of the beam in the manner desired for a particular system.

While this invention has been described in terms of various preferred embodiments, those skilled in the art will appreciate that various modifications, substitutions, omissions and changes may be made without departing from the spirit thereof. Accordingly, it is intended that the scope of the present invention be limited solely by the scope of the following claims, including equivalents thereof.

What we claim and desire to secure by letters of patent of the united states are the following:

1. A beam deflecting apparatus having an axis of rotation and a mounting member rotatable about the axis of rotation, said beam deflecting apparatus comprising:

(a) a deflection device for deflecting a beam and causing a particular wavefront error in the beam during rotation of said deflection device at a particular angular velocity about the axis of rotation; and (b) a wavefront correcting device for correcting said particular wavefront error in the beam, said wavefront correcting device and said deflection device being mounted on said mounting member in a fixed orientation relative to one another and to said mounting member, said wavefront correcting device and said deflection device being rotated with said mounting member at said particular angular velocity, said beam passing through said wavefront correcting device before being deflected by said deflection device.

2. The beam deflecting apparatus according to claim 1, wherein said particular wavefront error is a portion of a collective wavefront error in the beam, said wavefront correcting device also correcting at least a portion of said collective wavefront error other than said particular wavefront error, said portion of said collective wavefront error other than said particular wavefront error not being induced by said wavefront correcting device.

3. The beam deflecting apparatus according to claim 1, wherein said wavefront correcting device is a single wavefront correcting element, said beam passing through said wavefront correcting element before and after being deflected by said deflection device.

4. The beam deflecting apparatus according to claim 1, wherein said wavefront correcting device is attached to a reflecting surface of said deflection device.

5. The beam deflecting apparatus according to claim 1, wherein said wavefront correcting device includes a refractive element comprising two-non-parallel planar surfaces having a refractive medium therebetween.

6. The beam deflecting apparatus according to claim 1, wherein said beam is a non-collimated beam and said wavefront correcting device includes a refractive element having a rotationally symmetric lens being tilted at an angle that is not perpendicular with respect to a longitudinal axis of the non-collimated beam.

7. The beam deflecting apparatus according to claim 1, wherein a refractive element acts as said deflection device.

8. A beam deflecting apparatus having an axis of rotation and a mounting member rotatable about the axis of rotation, said beam deflecting apparatus comprising:

(a) a deflection device for deflecting a beam and causing a particular wavefront error in the beam during rotation of said deflection device at a particular angular velocity about the axis of rotation; and (b) a wavefront correcting device including a reflective element for correcting said particular wavefront error in the beam, said wavefront correcting device and said deflection device being mounted on said mounting member in a fixed orientation relative to one another and to said mounting member, said wavefront correcting device and said deflection device being rotated with said mounting member at said particular angular velocity.

9. A beam deflecting apparatus having an axis of rotation and a mounting member rotatable about the axis of rotation, said beam deflecting apparatus comprising:
   (a) a deflection device for deflecting a beam and causing a particular wavefront error in the beam during rotation of said deflection device at a particular angular velocity about the axis of rotation; and
   (b) a wavefront correcting device including a diffraction element for correcting said particular wavefront error in the beam, said wavefront correcting device and said deflection device being mounted on said mounting member in a fixed orientation relative to one another and to said mounting member, said wavefront correcting device and said deflection device being rotated with said mounting member at said particular angular velocity.

10. A beam deflecting apparatus having an axis of rotation and a mounting member rotatable about the axis of rotation, said beam deflecting apparatus comprising:
    (a) a deflection device for deflecting a beam and causing a particular wavefront error in the beam during rotation of said deflection device at a particular angular velocity about the axis of rotation; and
    (b) a wavefront correcting device for correcting said particular wavefront error in the beam, said wavefront correcting device and said deflection device being mounted on said mounting member in a fixed orientation relative to one another and to said mounting member, said wavefront correcting device and said deflection device being rotated with said mounting member at said particular angular velocity, said wavefront correcting device including a refractive element comprising two planar parallel surfaces having a refractive medium therebetween and said beam is a non-collimated beam, said refractive element being tilted at an angle that is not perpendicular with respect to a longitudinal axis of the non-collimated beam.

11. A beam deflecting apparatus having an axis of rotation and a mounting member rotatable about the axis of rotation, said beam deflecting apparatus comprising:
    (a) a deflection device for deflecting a beam and causing a particular wavefront error in the beam during rotation of said deflection device at a particular angular velocity about the axis of rotation; and
    (b) a wavefront correcting device for correcting said particular wavefront error in the beam, said wavefront correcting device and said deflection device being mounted on said mounting member in a fixed orientation relative to one another and to said mounting member, said wavefront correcting device and said deflection device being rotated with said mounting member at said particular angular velocity;
    (c) wherein the mounting member substantially encloses said deflection device and said wavefront correcting device, said mounting member further comprising an entrance aperture and an exit aperture through which the beam enters and exits the housing respectively, both said entrance aperture and said exit aperture being sealed by said wavefront correcting device.

12. A beam deflecting apparatus having an axis of rotation and a mounting member rotatable about the axis of rotation, said beam deflecting apparatus comprising:
    (a) a deflection device including a diffraction element for deflecting a beam and causing a particular wavefront error in the beam during rotation of said deflection device at a particular angular velocity about the axis of rotation; and
    (b) a wavefront correcting device for correcting said particular wavefront error in the beam, said wavefront correcting device and said deflection device being mounted on said mounting member in a fixed orientation relative to one another and to said mounting member, said wavefront correcting device and said deflection device being rotated with said mounting member at said particular angular velocity.

13. A beam deflecting apparatus having an axis of rotation and a mounting member rotatable about the axis of rotation, said beam deflecting apparatus comprising:
    (a) a deflection device for deflecting a beam and causing a particular wavefront error in the beam during rotation of said deflection device at a particular angular velocity about the axis of rotation, said deflection device including a mirror having a non-planar shape when not rotating; and
    (b) a wavefront correcting device for correcting said particular wavefront error in the beam, said wavefront correcting device and said deflection device being mounted on said mounting member in a fixed orientation relative to one another and to said mounting member, said wavefront correcting device and said deflection device being rotated with said mounting member at said particular angular velocity.

14. A method for correcting wavefront errors in a beam caused by at least one optical element in a beam scanning apparatus, said apparatus including a deflection device and a wavefront correcting device, comprising the steps of:
    (a) rotating the wavefront correcting device and the deflection device in unison about an axis of rotation;
    (b) directing the beam onto the deflection device thereby deflecting the beam and causing a wavefront error in the beam; and
    (c) correcting the wavefront error in the beam by passing the beam through the wavefront correcting device before the beam has been deflected by the deflection device.

15. The method according to claim 14, wherein the step of correcting the wavefront error in the beam is performed by a single wavefront correcting element before and after the beam is deflected by said deflection device.

* * * * *